Patented Feb. 7, 1933

1,896,504

UNITED STATES PATENT OFFICE

HAROLD J. BARRETT, OF WILMINGTON, AND EMMETTE F. IZARD, OF ELSMERE, DELAWARE, ASSIGNORS TO E. I. DU PONT DE NEMOURS & COMPANY, OF WILMINGTON, DELAWARE, A CORPORATION OF DELAWARE

PROTECTIVE AGENT FOR META STYRENE

No Drawing.    Application filed September 13, 1930. Serial No. 481,800.

This invention relates to meta styrene. More particularly it relates to compositions containing meta styrene. Still more specifically it relates to the prevent of the checking and deterioration of meta styrene and compositions containing it.

Meta styrene has many properties which make it desirable for use in coating compositions. It is soluble in relatively cheap solvents and can be applied as a protective finish in fairly concentrated solutions. Moreover, films of meta styrene are colorless, have satisfactory color stability, and have excellent water resistance. The durability of these films is unsatisfactory, however, due to the fact that after aging the films become brittle and develop checks or "crowfoot" cracks. Although the use of plasticizers retards this cracking, plasticizers do not overcome the cracking entirely, and if used in too great quantity produce thermoplastic films.

An object of this invention is to improve the durability of meta styrene and of compositions containing meta styrene. Other objects of the invention will become apparent as the description proceeds.

These objects are accomplished, generally speaking, by incorporating with the meta styrene or with the composition containing meta styrene a small amount of certain organic nitrogen compounds. Amino compounds, imino compounds, guanido compounds, and their derivatives have proved to be especially effective for this purpose. The use of 1% of the protective agent, based on the weight of meta styrene, appears to be sufficient. The use of higher percentages of the protective agent does not secure a sufficient increase in durability over the use of 1% to warrant the use of larger amounts. Percentages less than one percent also give useful results.

The following examples are illustrative of the invention but are not to be deemed in any sense limitative.

Example I

|  | Parts |
|---|---|
| Meta styrene | 35.0 |
| Dibutyl phthalate | 10.5 |
| Toluene | 69.0 |
| Xylene | 35.5 |
| Aniline | 0.35 |

When this lacquer was sprayed on steel panels it gave films which were 1.4 times as durable, based on the number of days aging before cracks developed, as films prepared from a similar lacquer containing no aniline.

Example II

The substitution of di-o-tolyl-guanidine for the aniline in the lacquer described in Example I gave a product of the same durability.

Example III

The use of nitroso-beta-naphthol in place of the aniline in Example I gave a lacquer whose films were about 1.4 times as durable as the control.

Example IV

|  | Parts |
|---|---|
| Meta styrene | 32.0 |
| Titanox | 21.0 |
| Dibutyl phthalate | 10.5 |
| Toluene | 57.8 |
| Xylene | 29.7 |
| Dimethylaniline | 0.32 |

Films of this enamel sprayed over undercoated steel were twice as durable as those of a similar enamel which contained no protective agent.

Example V

The substitution of dibutylamine for dimethylaniline in Example IV gave a product which was twice as durable as the unprotected enamel.

*Example VI*

The use of diphenylamine in place of dimethylaniline in Example IV gave an enamel whose films were twice as durable as those of the untreated enamel.

In addition to the protective agents given in the examples just cited, the following materials were also found to improve the durability of meta styrene films: Diphenyl guanidine, di-beta-naphthylamine, phenyl-alpha-naphthylamine, phenyl-beta-naphthylamine, dipropylamine, diphenyl-beta-naphthylamine, meta nitraniline, methyl-aniline, and ethylidene aniline. An examination of the various amines tested will show that primary, secondary, and tertiary amines are all represented. The term "an amino compound" as used in this specification is intended to include amino compounds, substituted amino compounds, etc. The examples include both aliphatic and aromatic nitrogen compounds.

Nitrogen compounds may be used in the preparation of all types of compositions containing meta styrene. The use of amines has been found to be particularly effective for the preparation of coating compositions from meta styrene.

An advantage of this invention lies in the prolongation of the life of meta styrene and of compositions containing meta styrene. Another advantage is the retardation of the cracking of meta styrene and compositions containing it.

As many apparently widely different embodiments of this invention may be made without departing from the spirit and scope thereof, it is to be understood that we do not limit ourselves to the specific embodiments thereof except as defined in the appended claims.

We claim:

1. A composition comprising meta styrene and di-o-tolyl-guanidine.

2. A composition comprising meta styrene, a softener, and di-o-tolyl-guanidine.

3. A composition comprising meta styrene, a softener, a solvent, and di-o-tolyl-guanidine.

4. A composition comprising about 35 parts of meta styrene, about 10.5 parts of dibutyl phthalate, about 100 parts of solvent, and about .35 parts of di-o-tolyl-guanidine.

5. A composition comprising meta styrene and one of a group of compounds consisting of aniline, di-o-tolyl-guanidine, nitroso-beta-naphthol, dimethyl aniline, dibutylamine, diphenylamine, diphenyl guanidine, di-beta-naphthylamine, phenyl-alpha-naphthylamine, phenyl-beta-naphthylamine, dipropylamine, diphenyl-beta-naphthylamine, meta nitraniline, methylaniline, and ethylidene aniline.

In testimony whereof we affix our signatures.

HAROLD J. BARRETT.
EMMETTE F. IZARD.